April 9, 1940.  G. A. ARNOLD  2,196,821
FILTER
Filed May 14, 1938
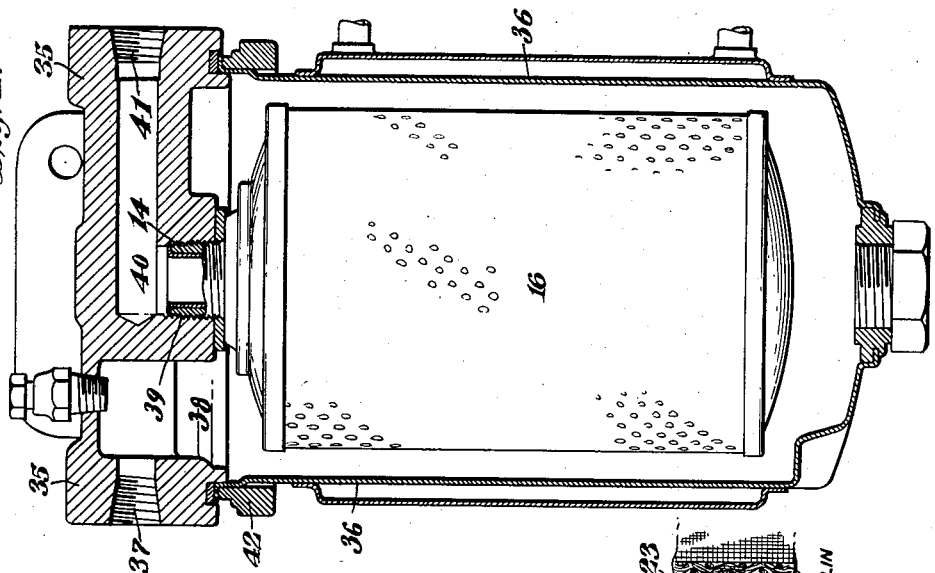
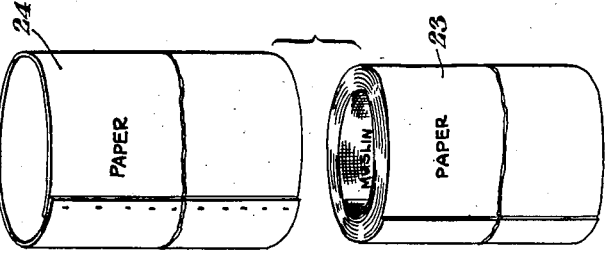
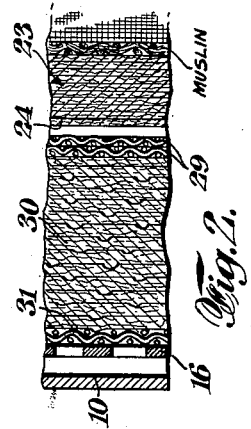
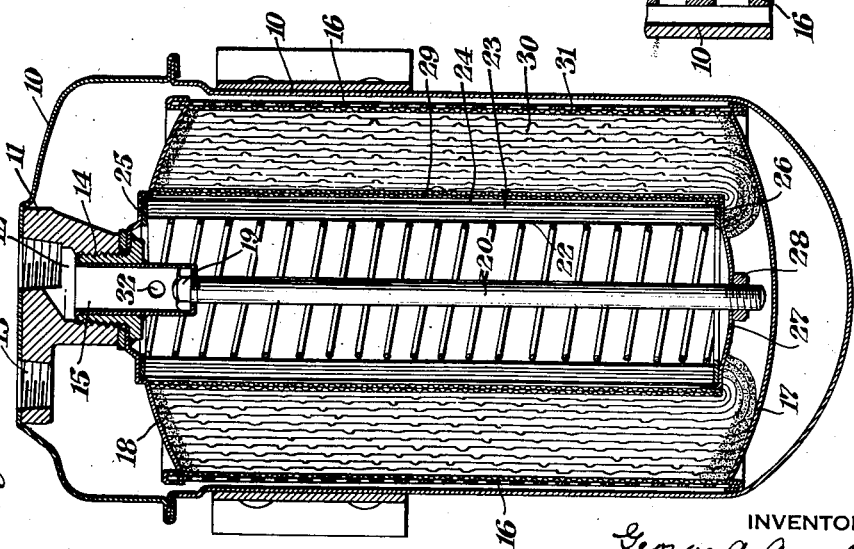
INVENTOR
George A. Arnold
BY Kenyon & Kenyon
ATTORNEYS.

Patented Apr. 9, 1940

2,196,821

UNITED STATES PATENT OFFICE 2,196,821

FILTER

George A. Arnold, Chatham, N. J., assignor to Motor Improvements, Inc., Newark, N. J., a corporation of Delaware Application May 14, 1938, Serial No. 207,918

8 Claims. (Cl. 210—178)

This invention relates to filters and more especially to filters for removing impurities from the fuel oil of Diesel engines. The injection mechanism of Diesel engines contains moving parts which measure to standards in millionths of an inch and unless abrasive particles of larger size than two or three millionths of an inch are removed from the fuel oil, the fine fit of the surfaces of the injection mechanism is destroyed by the abrasive particles and the mechanism can no longer function properly. To protect the injection mechanism, a filter is necessary which will be immediately effective to remove the minute abrasive particles and continue to be effective so long as the filter passes the oil.

An object of this invention is to provide a small compact filter which, over a relatively long period of active operation, will remove abrasive particles of greater than a few millionths of an inch from fuel oil from the start of oil flow as long as the filter passes oil, at a higher rate of flow than is required for the engine to which the fuel oil is supplied.

In one embodiment of the invention, the fuel oil is caused to pass through a filtering medium consisting of a considerable depth of vegetable fibre, preferably multiple layer cellulose wadding which is effective to absorb the larger portion of the abrasive particles which it is desired to remove as well as gum and tar. The fuel oil is then caused to pass through a second filtering medium composed of several plies of filter paper impregnated with a polymerized resin having the irreversible thermoplastic characteristics of phenol-formaldehyde resin which removes the minute particles not removed by the absorbent material. The first filtering medium removes the major portion of the minute particles until it becomes so full of filtrate that it can absorb no more but it still passes the fuel oil freely. After the first filtering medium has lost its ability to remove the minute particles, the second filtering medium takes over the task of removing all the impurities until eventually its surface becomes so coated with gum and tar as to terminate the flow of oil therethrough, although such medium remains at full efficiency as long as there is any flow of oil. The filter is then replaced with a new one.

The filter of this invention operates at full efficiency over a period of several thousand hours of engine operation and is of sufficiently small size that it may be associated with an engine without increasing the space requirements for the engine. Also, such filter may be produced at a relatively low cost so that the cost per gallon of filtering the fuel oil is insignificant.

Other objects, novel features and advantages of this invention will become apparent from the following specification and accompanying drawing, wherein:

Fig. 1 is a vertical section through a filter embodying the invention;

Fig. 2 is an enlarged fragmentary section of the same embodiment;

Fig. 3 is an exploded view of the second filtering medium, and

Fig. 4 is a vertical section through a modified embodiment.

In Fig. 1, a two-part can or casing 10 is provided at one end with a metal fitting 11 which is attached to the inner surface of the casing by solder or other suitable means. This fitting is provided with screw-threaded passageways registering with apertures in the end wall of the casing. The passageway 12 communicates with a threaded socket in which is screwed a flanged threaded sleeve 14 to which is rigidly connected a tube 15, the tube passing through the bore of the sleeve 14. The sleeve 14 constitutes the means for attaching to the fitting 11 the filtering unit later to be described.

The above-referred to filtering unit consists of a perforated metal cylinder 16 closed by imperforate end caps 17 and 18, each of which has its periphery spun over the rim of the cylinder 16. The sleeve 14 extends through the cap 18 and its flange presses the cap against the end of the fitting 11, a gasket 11a being interposed between the cover and fitting. The inner end of the tube 15 is closed by a plug 19 into which is threaded one end of a post 20. A wire helix 22 surrounds the post 20 and is enclosed by a cylinder 23. The cylinder 23 is composed of a length of filtering material spirally wound so as to present a number of plies and an enclosing tube 24. The inner turn of the cylinder comprises a strip of muslin impregnated with a polymerized resin having the irreversible thermoplastic characteristics of phenol-formaldehyde resin, such, for example, as Bakelite while the remaining turns consist of a length of standard filter paper impregnated with the same material as the muslin. The surrounding tube 24 likewise is composed of similarly impregnated filter paper.

One end of the cylinder 23 engages a gasket 25 supported by a shoulder in the cap 18 and the other end of the tube engages a gasket 26 supported by a flanged disk 27 through which the post 20 extends, the disk 27 being held in place by a nut 28. Directly surrounding the tube 24 is a wire mesh cylinder 29 and surrounding the wire mesh cylinder is a body 30 of absorbent material, for example, crimped cellulose wadding in the form of a continuous strip wound tightly about the wire mesh cylinder 29. Cement is applied to the ends of the body 30 to prevent inflow of oil at such ends. Between the body 30 and the perforate cylinder 16 is provided a wire mesh cylinder 31. An aperture 32 is provided in the tube 15 to provide communication between the interior of the tube 15 and the interior of the cylinder 23.

In constructing the filtering unit of this invention, the tube 23 (Fig. 3) is formed from a strip of suitable material by winding the same into spiral form around a mandrel. That portion of the strip which constitutes the inner turn is composed of muslin or other similar fabric which has been impregnated with a potentially active resin and subsequently dried, such material being purchasable on the open market. To the muslin is attached a strip of filter paper which constitutes the remaining turns. After this trip has been wound into spiral form, the tube 24 is placed around the spiral (Fig. 3) and the whole unit is then immersed in a solution of a potentially active resin to thoroughly distribute the solution throughout the filter paper. Next, the unit is subjected to sufficient temperature to polymerize the resin in the well-known manner.

Oil to be filtered is introduced into the can through the passageway 13 and flows inwardly first through the body of cellulose wadding 30 and next through the cylinder 23 into the space adjacent the rod 20 from which it is discharged through the aperture 32 to the outlet passage 12. The wire mesh cylinder 31 insures uniform distribution of the liquid over the entire periphery of the filtering body 30 and likewise the wire mesh cylinder 29 insures uniform distribution of liquid over the surface of the cylinder 23. The cement at the ends of the body 30 prevents oil by-passing the body 30 or entering the body at its ends.

In Fig. 4, a head 35 has a cylindrical groove in which is received the flanged rim of a jacketed shell 36 which co-operates with the head to form a casing. In the head 35 is provided a threaded socket 37 which communicates with a passageway 38 leading into the interior of said casing. The head 35 also is provided with a centrally arranged threaded recess 39 which communicates with a passageway 40 terminating in a threaded socket 41. The shell 36 is held in assembled relation to the head 35 by a ring 42 which engages the flange of the shell and is clamped to the head by bolts (not shown).

A filtering unit of the same structure as disclosed in Figs. 1 to 3 is contained within the casing and the sleeve 14 of the unit is screwed into the recess 39. Oil to be filtered is supplied to the interior of the casing through the socket 37 and passageway 38 and passes into the filtering unit through the perforations in the cylinder 16, and is discharged from the filtering unit through the sleeve 14, the passageway 40 and the threaded socket 41. A suitable heating fluid is circulated through the jacket to maintain the temperature in the filter at the optimum value for filtration of fuel oil. The filtering unit is replaced by removing the shell 36 and disengaging the unit from the base 35 and a new unit is inserted by the reverse procedure.

The above-described filter operates at full efficiency throughout its life so that there is no possibility of abrasive particles reaching the injection mechanism as would be the case if the filter functioned at less than full efficiency at the beginning and end of its operating life. The cellulose wadding is effective to absorb gum and tar from the oil as well as some of the abrasive particles while the filtering medium 23 removes such particles as are carried through the cellulose wadding by the oil. After the cellulose wadding has absorbed all the dirt, and tar that it is capable of absorbing, it still passes oil as freely as originally and the full load is then taken by the filtering medium 23 which continues to fully remove the impurities. While the cellulose wadding is functioning, it protects the tube 23 from becoming clogged with tar and gum and after it has absorbed its full capacity of impurities and ceases to function as an absorbent, gum and tar are deposited on the surface of the filtering medium 23, thereby eventually clogging such medium and stopping the flow of oil through the filter. However, until the filtering medium 23 becomes so clogged that it will no longer pass oil, it is effective fully to remove the abrasive particles so that the filter operates at 100% efficiency so long as it passes oil and at no time is there any possibility of the abrasive particles reaching the injection mechanism.

The filter removes impurities solely by physical or mechanical action without chemically affecting the fuel oil and so delivers the oil to the engine with all the additives introduced at the refinery for improving the characteristics of the oil as fuel for Diesel engines.

Certain low grade fuel oils contain ingredients which at temperatures below normal summer atmospheric temperature are in the form of gelatinous globules, but which at higher temperatures become fully liquid. To maintain maximum efficiency with such fuel oil, it must be sufficiently heated completely to liquify such ingredients before its injection into the engine. The jacket of the shell 40 provides means for warming the fuel oil for a tractor engine or the like by circulating therethrough either the engine coolant or the exhaust gases and permits the use of a lower grade fuel oil for the engine than could otherwise be used.

It is of course understood that cellulose wadding is merely exemplary of the absorbent material which may be used in the filter and it is contemplated that other vegetable fibre of similar absorbent characteristics may be used. Furthermore, it is apparent that various changes may be made in the structure above described without in any way departing from the spirit of the invention as defined in the appended claims.

I claim:

1. A filtering unit comprising a tube consisting of a plurality of turns of sheet material impregnated with a polymerized resin having the irreversible thermoplastic characteristics of phenol-formaldehyde resin, a filtering medium surrounding said tube and consisting of a plurality of turns of absorbent sheeting, and means for flowing oil successively through said filtering medium and said tube wall.

2. A filter according to claim 1 wherein means are provided for distributing the oil uniformly over the surfaces of said filtering medium and said tube.

3. A filtering unit comprising a tube consisting of a single turn of fabric surrounded by a plurality of turns of filter paper both impregnated with a polymerized resin having the irreversible thermoplastic characteristics of phenol-formaldehyde resin, a filtering medium surrounding said tube and consisting of a plurality of turns of cellulose wadding, and means for flowing oil successively through said filtering medium and said tube wall.

4. A filtering unit according to claim 3 wherein means are provided for distributing the oil uniformly over the surfaces of said filtering medium and said tube.

5. A filter comprising a cylindrical casing having perforations in its side wall and imperforate ends, a member extending between the ends of said casing, a tube having one end engaging one end of the casing, said tube consisting of a plurality of turns of sheet material impregnated with a polymerized resin having the irreversible thermoplastic characteristics of phenol-formaldehyde resin, a cap carried by said member and closing the other end of said tube, a body of filtering material between said tube and casing wall, said body having its ends cemented to the casing ends and consisting of a plurality of turns of cellulose wadding, and a passageway communicating with the interior of said tube.

6. A filtering unit comprising a first tube consisting of a plurality of layers of filter paper impregnated with a polymerized resin having the irreversible thermoplastic characteristics of phenol-formaldehyde resin, a second tube surrounding said first tube and consisting of a plurality of layers of crimped cellulose wadding, means sealing the ends of said tubes, means for supplying liquid to be filtered to the exposed surface of one of said tubes, and means for removing filtered liquid from the exposed surface of the other tube.

7. A filter according to claim 6 in which said bodies are enclosed in a cylindrical container having imperforate ends and a perforate side wall, and a passageway communicates with the interior of the first tube.

8. A filtering unit comprising a tube consisting of a spirally wound length of filtering material impregnated with a polymerized resin having the irreversible thermoplastic characteristics of phenol-formaldehyde resin, the first turn consisting of fabric and the remaining turns consisting of filter paper.

GEORGE A. ARNOLD.